United States Patent [19]

Bernardi

[11] 3,922,926
[45] Dec. 2, 1975

[54] STEPPING DRIVE
[75] Inventor: Herbert Bernardi, Munich, Germany
[73] Assignee: G.A.O. Gesellschaft fur Automation und Organisation m.b.H., Germany
[22] Filed: Apr. 12, 1974
[21] Appl. No.: 460,452

[30] Foreign Application Priority Data
Apr. 13, 1973 Austria .............................. 3312/73

[52] U.S. Cl. .......................... 74/63; 74/52; 74/112; 74/43
[51] Int. Cl.² ......................................... F16H 21/12
[58] Field of Search ........... 74/43, 801, 802, 51, 52, 74/128, 70, 63, 112

[56] References Cited
UNITED STATES PATENTS

| | | | |
|---|---|---|---|
| 432,386 | 7/1890 | Emmons | 74/128 |
| 2,228,400 | 1/1941 | Otto | 74/43 |
| 2,358,884 | 9/1944 | Stegall | 74/52 |
| 3,468,173 | 9/1969 | Fracke | 74/52 |
| 3,529,485 | 9/1970 | Köfferlein | 74/52 |

FOREIGN PATENTS OR APPLICATIONS

| | | | |
|---|---|---|---|
| 610,104 | 10/1960 | Italy | 74/43 |
| 977,648 | 11/1950 | France | 74/802 |

Primary Examiner—Samuel Scott
Assistant Examiner—Wesley S. Ratliff, Jr.
Attorney, Agent, or Firm—McGlew and Tuttle

[57] ABSTRACT

A stepping drive comprises an input shaft, an output shaft, and a planetary gearing and a crank mechanism mounted therebetween. The planetary gearing is mounted concentrically of the input shaft and includes a fixed central gear and at least one planet gear carried by a secondary shaft which is supported by and rotatably mounted in a planet carrier. The planet gear performs a revolving motion synchronous with a uniform, basic rotary motion of the input shaft and, simultaneously, a rotary motion about its own axis. The crank mechanism is a four-bar linkage including a planet crank arm fixed to the secondary shaft carrying the planet gear, an output crank arm fixed to the output shaft, and a connecting rod therebetween. The revolving motion of the planet gear around the central gear is transmitted by the crank mechanism to the output shaft as the basic rotary motion synchronous with that of the input shaft. The rotary motion of the planet gear about its own axis is transformed by the crank mechanism into a swinging, reciprocating motion of the output crank arm which motion is superimposed on the basic rotary motion of the output shaft so that the resulting motion of the latter is a sine-like accelerating and decelerating rotation. The frequency and amplitude of this stepping motion may be adjusted by the gear ratio of the planetary gearing and the length of the linkage members in the crank mechanism.

7 Claims, 3 Drawing Figures

STEPPING DRIVE

BACKGROUND OF THE INVENTION

1. Field of the Invention

The present invention relates to a stepping drive, i.e., to a drive which, at constant input angular velocity, generates a sine-like response of the output angular velocity; this means that the output shaft stops for a short time at the negative peaks of the sine curve.

2. Description of the Prior Art

Such movements are frequently needed in engineering, e.g. to rapidly feed flat articles, such as cards or sheets of paper, to a processing device and for short stops to permit accurate positioning.

It is known that in stepping drives such as Geneva or slider-crank mechanisms, so-called slideways are used. Since, however, high accelerations occur and large masses must be accelerated in these known stepping drives, the latter are subject to rapid wear already at relatively low step frequencies and are correspondingly short-lived.

SUMMARY OF THE INVENTION

The present invention has for its object to provide a stepping drive which permits a high step frequency while being simple in construction and having a long service life.

The invention thus relates to a stepping drive for high step frequencies which, at constant input angular velocity, generates a sine-like response of the output angular velocity, which means that one or more stops are caused during each revolution of the input shaft.

According to the invention, this object is attained by superimposing a crank motion on a rotary motion at constant input angular velocity so that the desired sine-like output angular velocity is obtained.

To obtain a balanced rotary motion, it is advantageous to provide two symmetrical planetary gearings which act on the output shaft in the same direction of rotation.

By changing the transmission ratio in the planetary gearing and suitably choosing the connecting-rod and crank lengths, the drive characteristic is adaptable to different tasks. The transmission ratio in the planetary gearing determines the number of superpositions of the crank motions and thus of stops per revolution of the input shaft, while the ratio of the crank-arm lengths determines the amplitude of the superposition speed. The distortion of the speed response curve can be influenced by the connecting-rod length. It must be taken into account, however, that these three parameters cannot be chosen quite freely, but are variable only over a limited range because of the constrained-motion condition.

If the transmission ratio of the planetary gearing is equal to one, there will be one stop per revolution of the input shaft. If, furthermore, the maximum speed of the oppositely directed crank motion is equal to the speed of the rotary motion, the output shaft will come to a short stop and will immediately be accelerated again. The angular velocity of the output shaft thus oscillates between zero and the double angular velocity of the input shaft.

The stepping drive according to the invention permits high step frequencies to be achieved because, through the principle of the planetary-gear-driven crank, a sine-like speed superposition is obtained and because this steady speed response causes only relatively low angular accelerations. Low accelerations, however, result in small forces and thus permit high step frequencies. In addition, since only pivot bearings are used, low-cost manufacture, quiet running, a low rate of wear and thus a long life can be achieved.

Another advantage of the invention is that the characteristic of the drive can be changed in a simple manner, so that the principle according to the invention provides a universal stepping drive which is usable from start-stop operation, also with pilgrim step, to reversible operation. Finally, the compact design of the novel drive with the aligned input and output shafts also guarantees a wide range of applications.

Accordingly, it is an object of the invention to provide a method of effecting a stepping drive in which a uniform, basic rotary motion of an input shaft driven at a constant angular velocity is transformed, by means of a planetary gearing concentric of the input shaft, into a revolving motion of a planet member simultaneously performing a rotary motion about its own axis and the dual revolving and rotary motion of the planet member is transmitted, by means of a crank mechanism, to an output shaft whereby the latter receives both the revolving motion synchronous with the basic rotary motion of the input shaft and a superimposed acceleration and deceleration due to an oscillatory motion of a crank arm caused by the rotary motion of the planet member and transmitted by the crank mechanism.

Another object of the invention is to provide a stepping drive comprising an input shaft driven at a constant angular velocity corresponding to a basic rotary motion, an output shaft, a planetary gearing mounted concentrically of the input shaft and including a fixed sun gear, a planet carrier permanently mounted on the input shaft, and a secondary shaft supported by the carrier and carrying a planet gear and a planet crank arm, a crank mechanism connected between the secondary shaft and the output shaft and including the planet crank arm, a connecting rod, and an output crank arm, both crank arms being rigidly fixed to the respective shafts, so that the revolving motion of the planet gear about the input shaft axis is transmitted to the output shaft as the basic rotary motion and the rotary motion of the planet gear about its own axis is transformed into a swinging motion of the output crank arm which is superimposed on the basic rotary motion of the output shaft as a sine-like acceleration or deceleration of the same.

A further object of the invention is to provide two planet gears and two corresponding crank mechanisms acting in the same direction to balance the acting forces.

Still another object of the invention is to provide the component parts of the planetary gearing and of the crank mechanism which are easily replaceable to permit the gear ratio and the length of the links of the crank mechanism to be adapted to the required frequency and amplitude of the resulting start-stop motion.

BRIEF DESCRIPTION OF THE DRAWINGS

The invention will now be explained in more detail by way of example with reference to the accompanying drawings.

GENERAL DESCRIPTION OF THE PREFERRED EMBODIMENT

Figure 1:
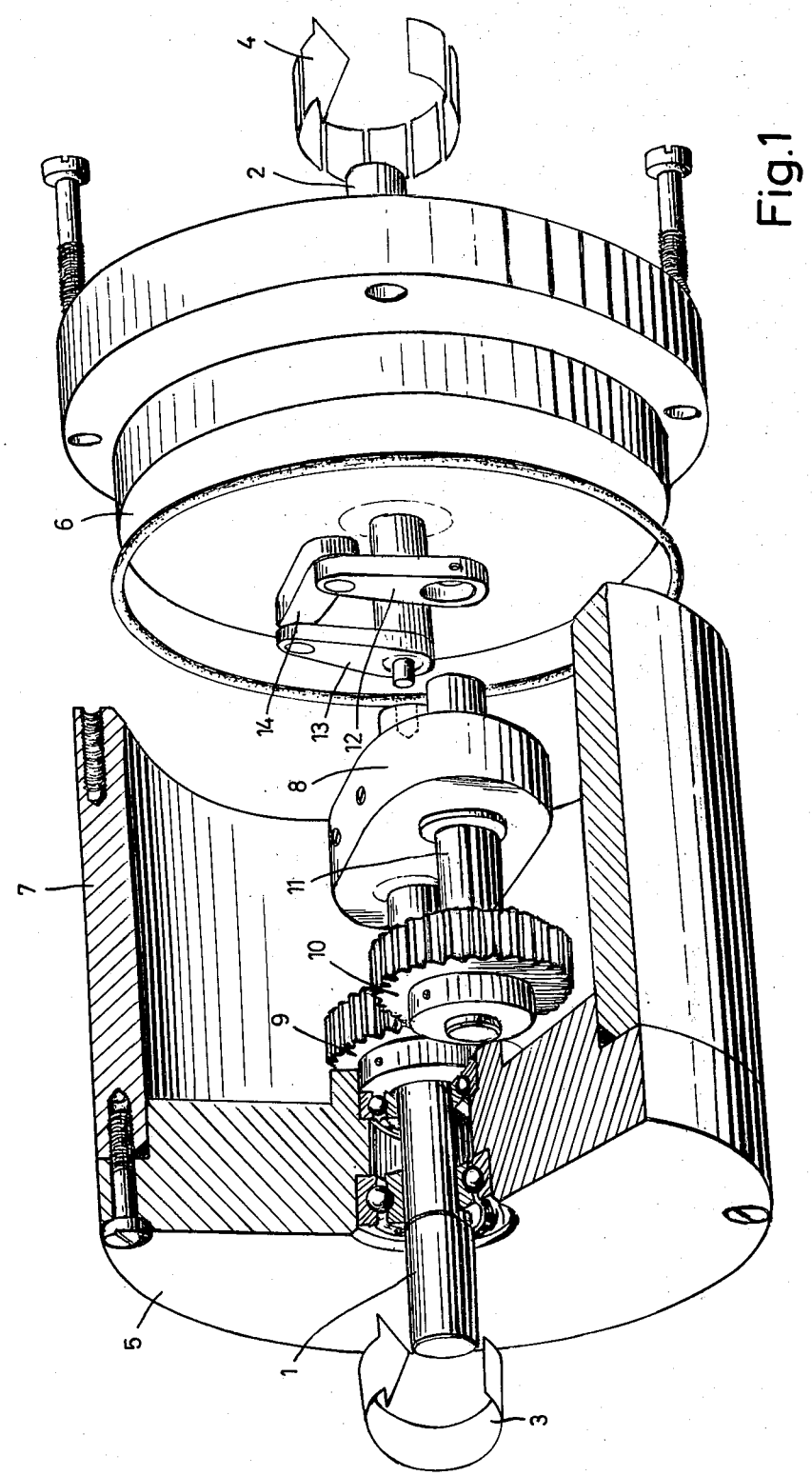
FIG. 1 shows a stepping drive according to the invention in a diagram.

The stepping drive comprises the constantly driven input shaft 1 and the output shaft 2, which performs a start-stop motion. The arrow 3 indicates the constant motion, and the broken arrow 4 the start-stop motion. The input shaft 1 is supported in the casing cover 5, while the output shaft 2 is supported in the part 6.

In FIG. 1, the casing 7 has been opened and somewhat drawn apart, so that the planetary gearing can be better explained.

The planet carrier 8 is permanently mounted on the input shaft 1 and guides, via a shaft 11 supported in it, the planetary gear 10 around the sun gear 9 attached to the casing cover 5, the planetary gear 10 and the sun gear 9 meshing with one another.

The shaft 1 now provides the constant rotary motion on which the crank motion of the four-bar linkage is superimposed. The four-bar linkage, consisting of the planetary crank 12, which is joined to the shaft 11, the connecting rod 14, which is supported at both ends, and the output crank 13, which is joined to the output shaft 2, delivers to the output shaft 2 the start-stop motion.

Figure 2:
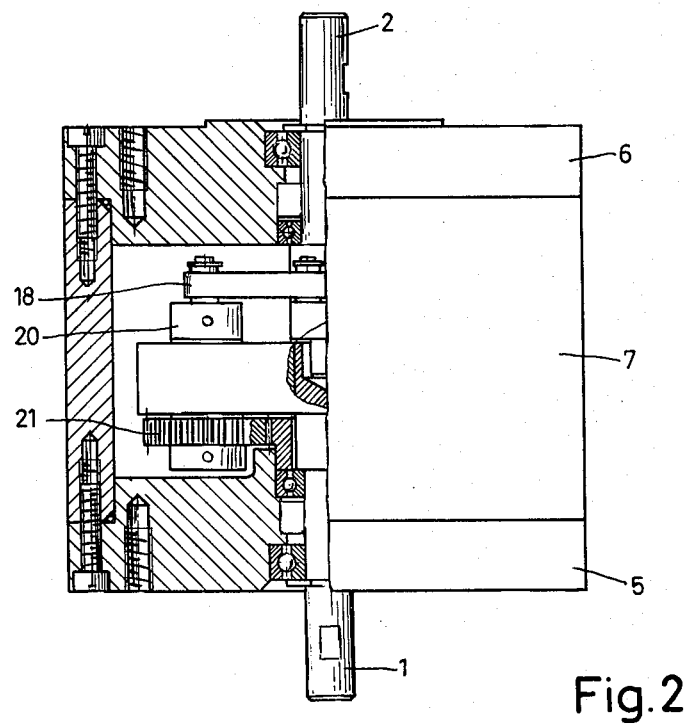
FIGS 2 and 3 are sections through a stepping drive with two symmetrical planetary gearings.
Figure 3:
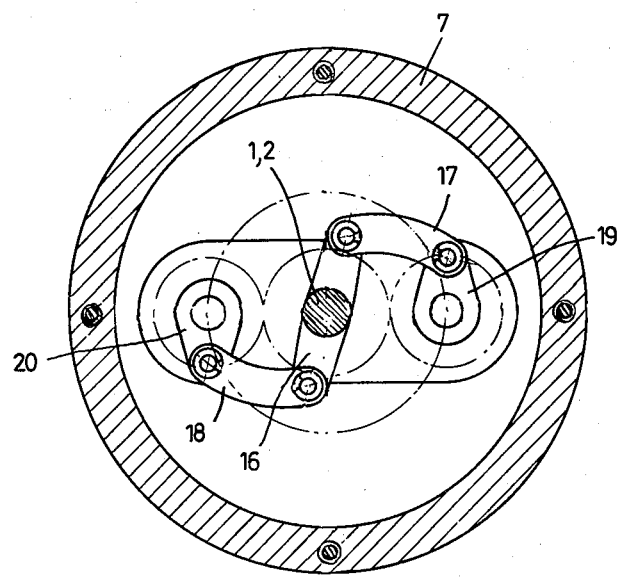

FIGS. 2 and 3 show another embodiment of the invention in which two symmetrical planetary gearings are provided, which insures a better balanced motion. These figures are understandable by themselves if FIG. 1 is taken into account. FIG. 3 shows the double crank 16, which is mounted on the output shaft 2 and at each of whose two ends is pivoted a connecting rod 17, 18, each of which, in turn, is hinged to a planetary crank 19, 20. In FIG. 2, the casing 7 is half open so that the planetary gear 21 can be seen.

What Is Claimed Is:

1. A stepping drive for high step frequencies which, at constant input angular velocity, generates a sinelike response of the output angular velocity, i.e., permits, for example, one or more stops of the output shaft per revolution of the input shaft, characterized in that a crank motion is superimposed on a uniform rotary motion, so that the desired sine-like output angular velocity is obtained.

2. A stepping drive for high step frequencies, comprising an input shaft adapted to be driven at a constant angular velocity thereby performing a basic rotary motion, an output shaft, a planetary gearing associated with said input shaft and including a fixed sun gear mounted concentrically of said input shaft, a planet carrier permanently mounted on said input shaft for rotation therewith, a secondary shaft parallel to and spaced from said input shaft extending through and supported by said planet carrier for free rotation, and a planet gear meshing with said sun gear meshing with said sun gear and rigidly mounted on said secondary shaft for rolling on said sun gear, a crank mechanism embodying a four-bar linkage connected to said output shaft and, through said secondary shaft and said planet carrier, to said input shaft and including a planet crank joined to said secondary shaft for rotation therewith and having a free end, an output crank joined to said output shaft for rotation therewith and having a free end, and a connecting rod pivoted to and connecting said free ends of said planet and output cranks, whereby said output shaft, in operation, receiving said basic rotary motion from said input shaft through said planet carrier, said secondary shaft and said crank mechanism, and a superimposed alternate rotary motion, accelerating and decelerating in accordance with a sine-like function, from the oscillatory motion of said output crank caused by said rotary motion of said secondary shaft transmitted through said crank mechanism.

3. A stepping drive for high step frequencies, according to claim 2, wherein two planet gears symmetrically arranged relative to said gun gear and two corresponding crank mechanisms conjointly acting on said output shaft in the same direction of rotation are provided.

4. A stepping drive for high step frequencies, according to claim 2, wherein said input shaft and said output shaft are axially aligned with each other.

5. A stepping drive for high step frequencies, according to claim 2, wherein said planet crank, said output crank and said connecting rod are disconnectably connected to each other so as to permit replacement for changing the amplitude of the output motion.

6. A stepping drive for high step frequencies, according to claim 2, wherein said planet gear and said sun gear as well as said planet carrier are detachably mounted so as to permit replacement for changing the frequency of the output motion.

7. A method of effecting a stepping drive for high step frequencies, comprising driving an input member at a constant angular velocity corresponding to a uniform, basic rotary motion, transforming said basic rotary motion into a synchronous revolving motion of a planet member of a planetary gearing simultaneously performing a rotary motion about its own axis, retransforming said revolving motion of said planet member into a synchronous rotary motion of an output member by means of a crank mechanism including a planet crank arm fixed to and rotating with said planet member, a connecting rod, and and output crank arm fixed to and rotating with said output member, thereby imparting to said output member said basic rotary motion, imparting to said output crank arm a swinging motion following a sine-like function by transforming said rotary motion of said planet crank arm through said connecting rod into an oscillatory motion of said output crank arm, thereby superimposing said oscillatory motion on said basic rotary motion of said output member and obtaining a sine-like periodical change of the angular velocity of said output member.

* * * * *